United States Patent
Odaibo

(10) Patent No.: US 12,437,837 B2
(45) Date of Patent: Oct. 7, 2025

(54) REASONING FROM SUPERVISED FINE TUNING OF LANGUAGE FUSION MODELS FOR AI-BASED PROTEIN AND DRUG DESIGN

(71) Applicant: Stephen Gbejule Odaibo, Sugar Land, TX (US)

(72) Inventor: Stephen Gbejule Odaibo, Sugar Land, TX (US)

(73) Assignee: Deep EigenMatics LLC, Sugar Land, TX (US)

( * ) Notice: Subject to any disclaimer, the term of this patent is extended or adjusted under 35 U.S.C. 154(b) by 0 days.

(21) Appl. No.: 19/207,265

(22) Filed: May 13, 2025

(65) Prior Publication Data
US 2025/0273290 A1    Aug. 28, 2025

(51) Int. Cl.
| | |
|---|---|
| *G01N 33/48* | (2006.01) |
| *G01N 33/50* | (2006.01) |
| *G06N 3/08* | (2023.01) |
| *G16B 15/20* | (2019.01) |
| *G16B 15/30* | (2019.01) |

(52) U.S. Cl.
CPC ............ *G16B 15/30* (2019.02); *G06N 3/08* (2013.01); *G16B 15/20* (2019.02)

(58) Field of Classification Search
CPC ........... G16B 15/30; G16B 15/20; G06N 3/08
See application file for complete search history.

(56) References Cited

U.S. PATENT DOCUMENTS

| | | | | |
|---|---|---|---|---|
| 2023/0377690 | A1* | 11/2023 | Anand | G16B 15/00 |
| 2023/0409904 | A1* | 12/2023 | Birru | G06N 3/042 |

FOREIGN PATENT DOCUMENTS

| | | | | | |
|---|---|---|---|---|---|
| CN | 110689918 | A | * | 1/2020 | G16B 5/00 |
| CN | 117912545 | A | * | 4/2024 | G06N 3/08 |

OTHER PUBLICATIONS

English machine translation of CN 117912545 A. (Year: 2025).*
English machine translation of CN 110689918 A. (Year: 2025).*
Cobbe et al. Training verifiers to solve math word problems. arXiv, 22 pages. (Year: 2021).*
Wei et al. Chain-of-thought prompting elicits reasoning in large language models. Advances in Neural Information Processing Systems, vol. 35, 24824-24837. (Year: 2022).*

(Continued)

*Primary Examiner* — Russell S Negin

(57) ABSTRACT

Methods and apparatus for obtaining representations of proteins and small molecule drugs for synthesis; wherein pre-trained mixed modality protein and natural language fusion models are further trained by supervised fine tuning using reasoning-oriented query—chain-of-thought (CoT) response pairs. The resulting reasoning-oriented neural network is then used to obtain representations of output proteins or small molecule drugs, in response to mixed modality reasoning-oriented input queries specifying conditions on the output. In one embodiment, the neural network is an autoregressive multicapitate transformer whose decoder output heads correspond to the represented modalities. The method returns mixed modality output representations of proteins or small molecule drugs for synthesis or manufacture.

20 Claims, 14 Drawing Sheets

Schematic Illustration of a Recursive Supervised Fine Tuning Schema yielding a Reasoning Fusion Language Model.

(56) References Cited

OTHER PUBLICATIONS

Kojima et al. Large language models are zero-shot reasoners. Advances in Neural Information Processing Systems, vol. 35, pp. 22199-22213. (Year: 2022).*

Lightman et al. Let's verify step by step. The Twelfth International Conference on Learning Representations, 24 pages. (Year: 2024).*

* cited by examiner

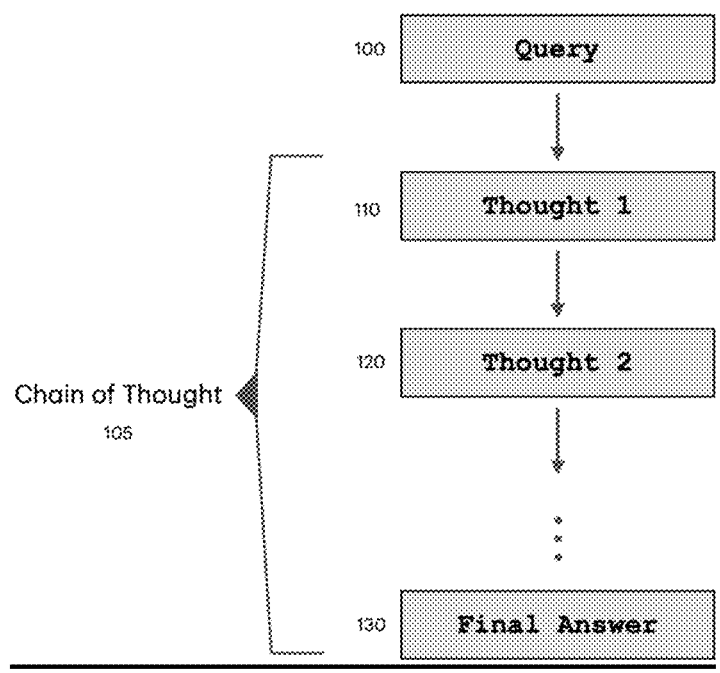
FIG. 1 Schematic Illustration of a Chain-of-Thought (CoT) Example.

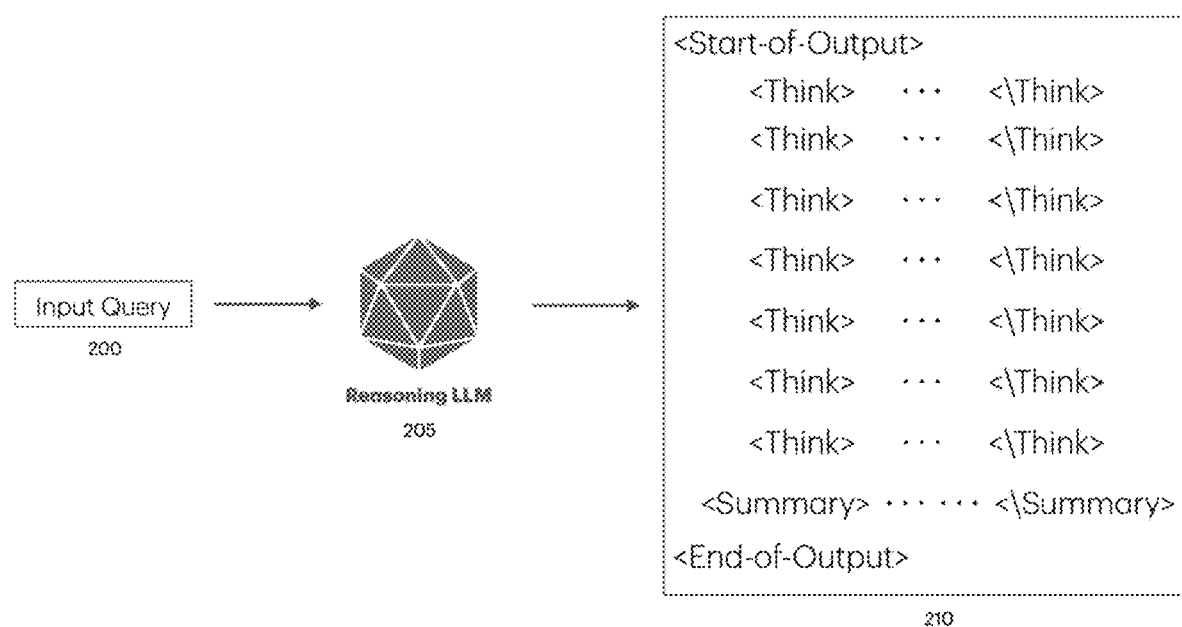
FIG. 2 Illustrative Example of a Chain-of-Thought Syntax Format.

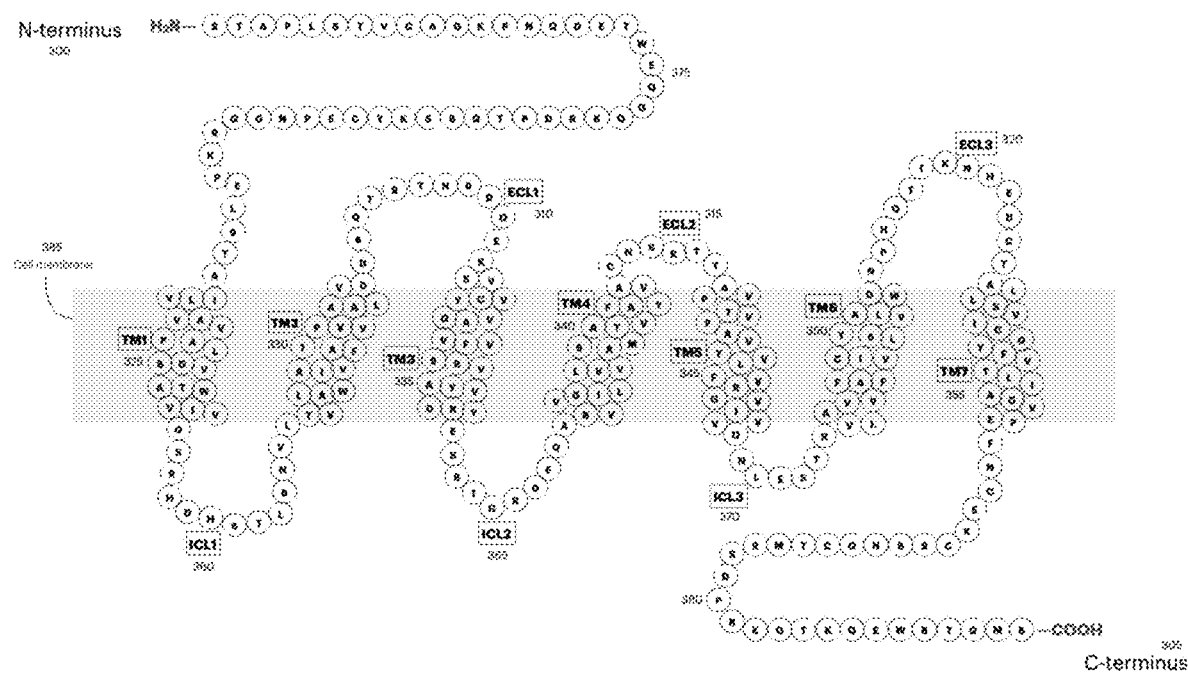
FIG. 3 A 2D Representation of a G-Protein Coupled Receptor (GPCR).

FIG. 4 Illustrative Example of a Long Chain-of-Thought Output Response to an Input Query.

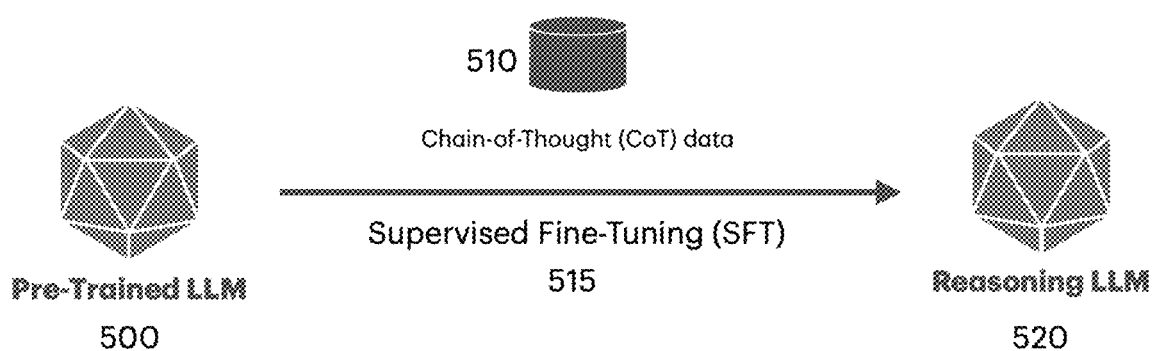
FIG. 5 Schematic Overview of Supervised Fine Tuning with Chain-of-Thought Data yielding a Reasoning Fusion Language Model.

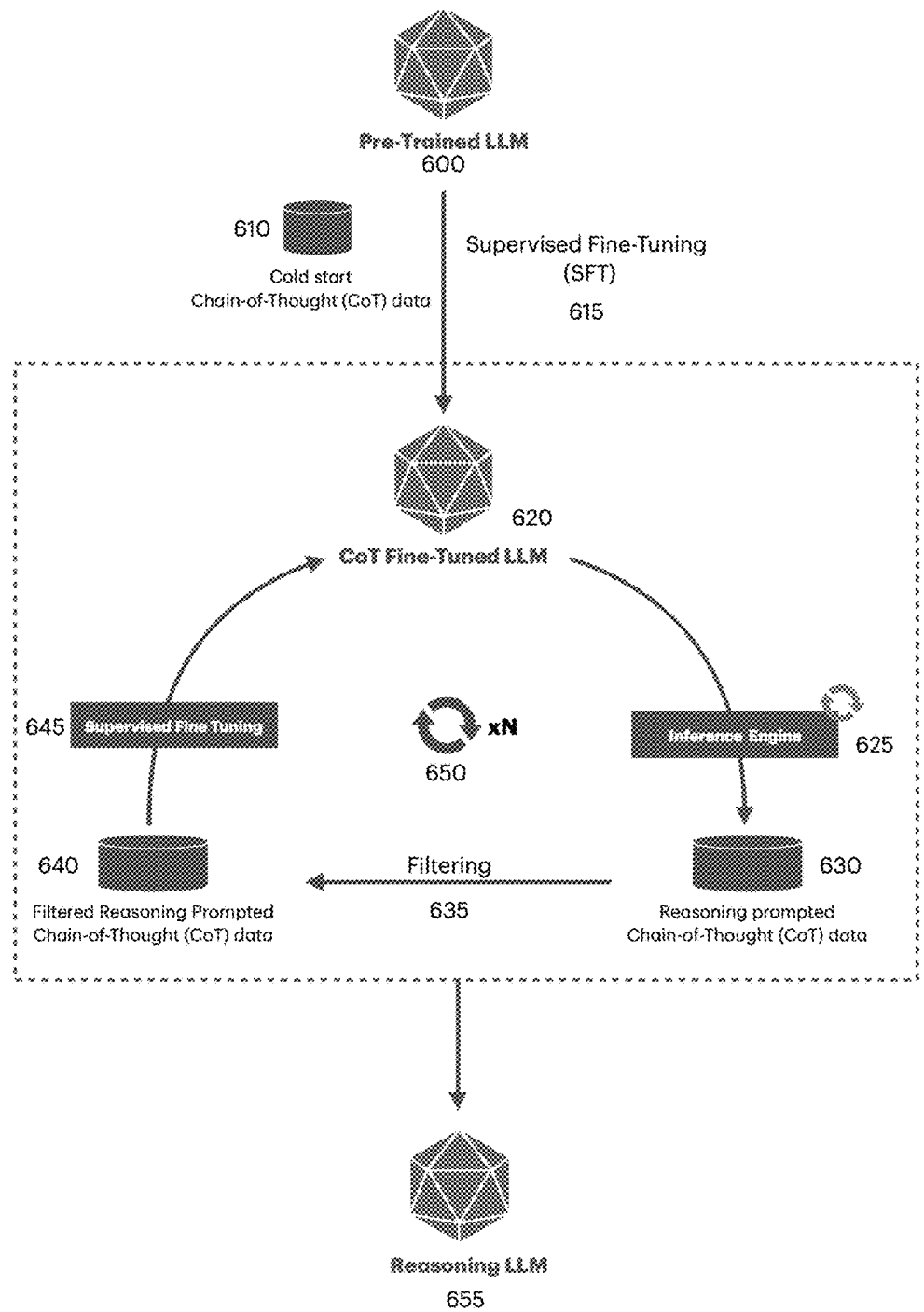
FIG. 6 Schematic Illustration of a Recursive Supervised Fine Tuning Schema yielding a Reasoning Fusion Language Model.

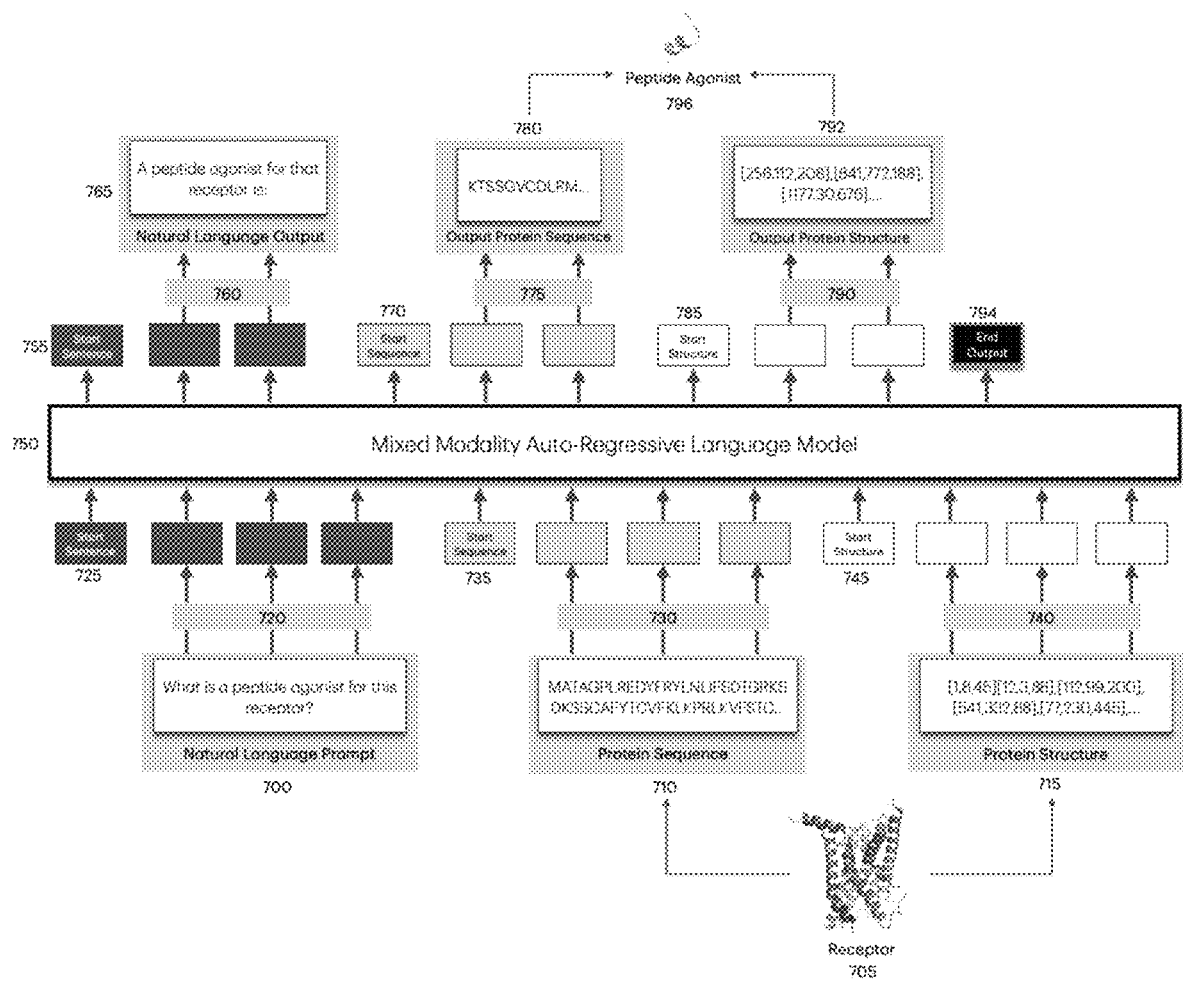
FIG. 7 Illustrative Overview of Inference with a Mixed-Modal Early-Fusion Language Model for Protein and Drug Design.

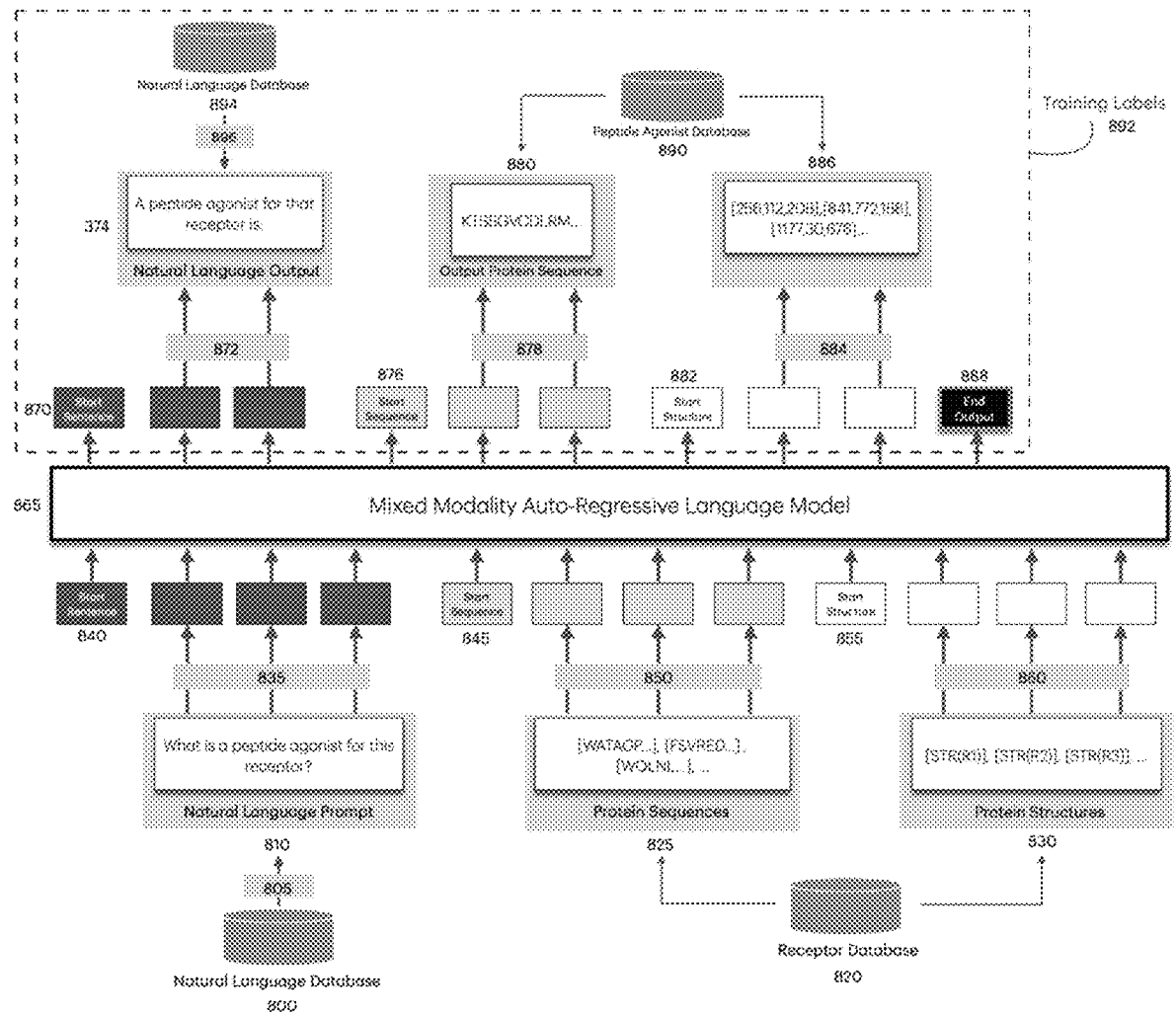
FIG. 8 Illustrative Overview of a Training Process for a Mixed-Modal Early-Fusion Language Model for Protein and Drug Design.

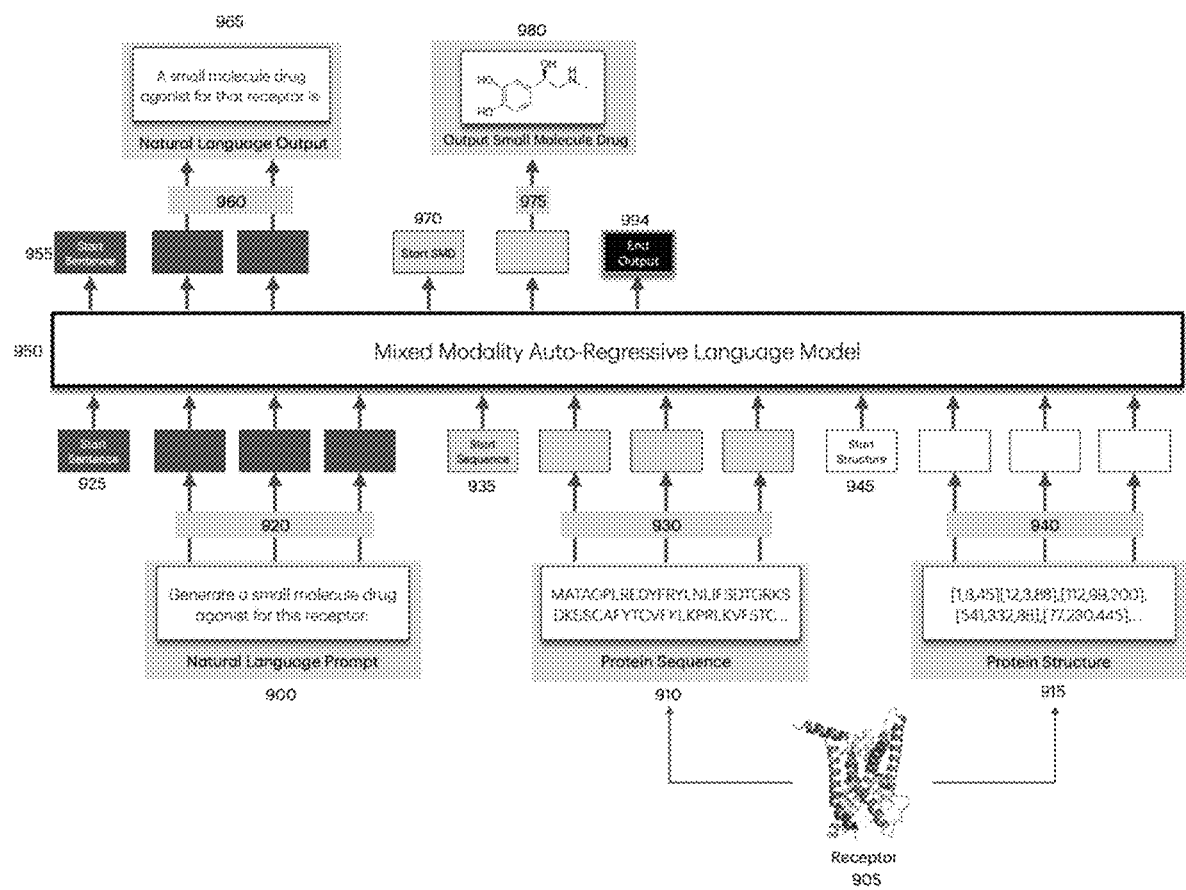
FIG. 9 Illustrative Overview of the Inference Process with a Mixed-Modal Early-Fusion Language Model for Small Molecule Drug Design.

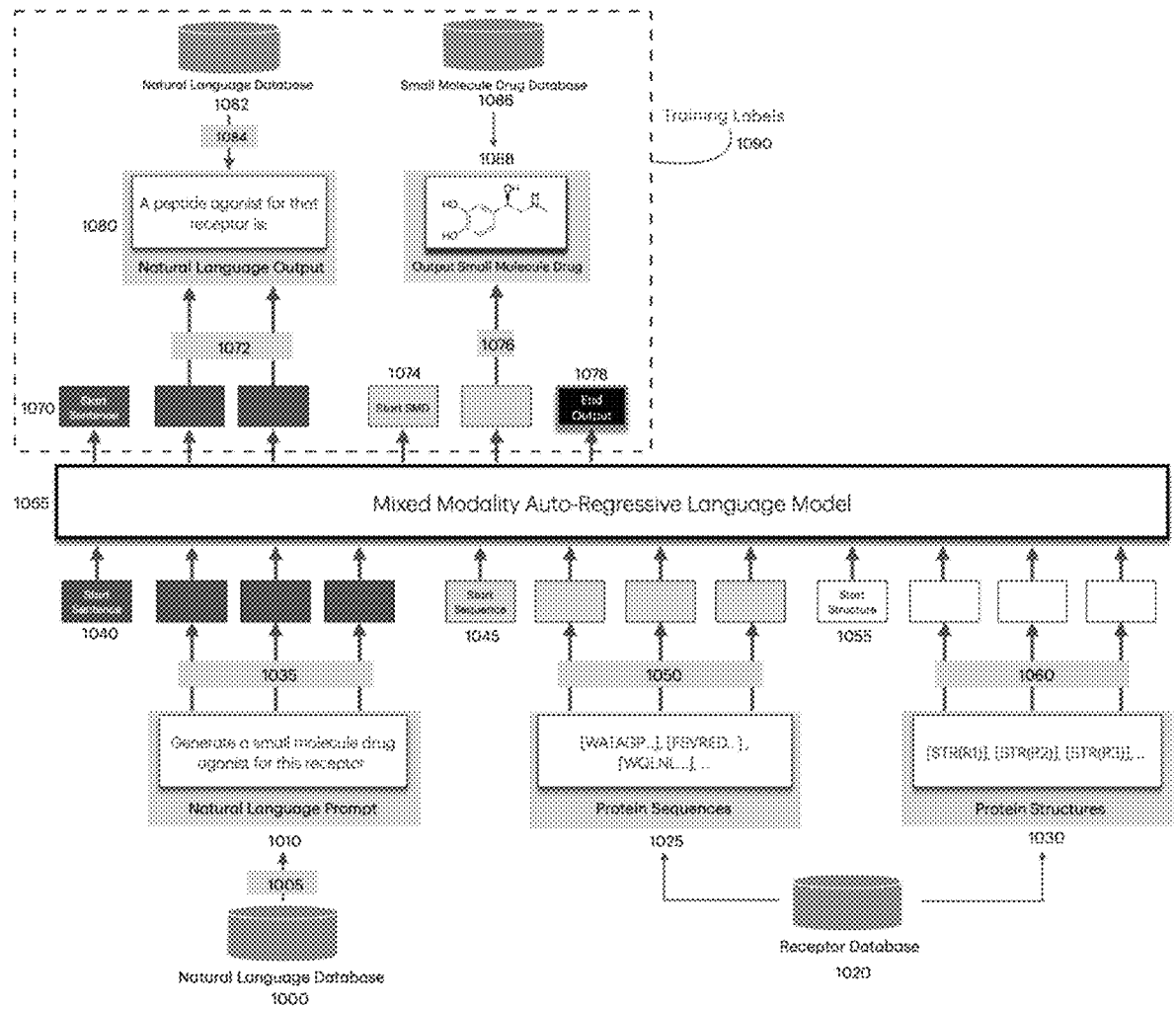
FIG. 10 Illustrative Overview of the Pre-Training Process for a Mixed-Modal Early-Fusion Language Model for Small Molecule Drug Design.

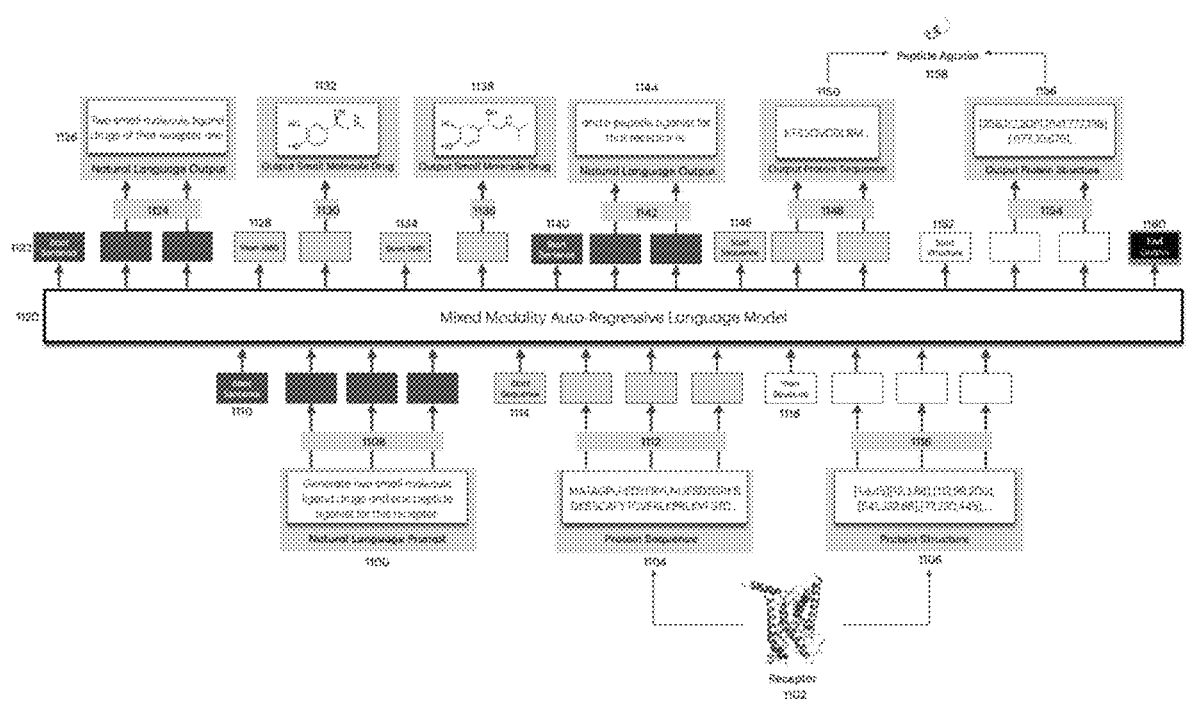
FIG. 11 Illustrative Overview of Inference for an Interleaved Modality Task.

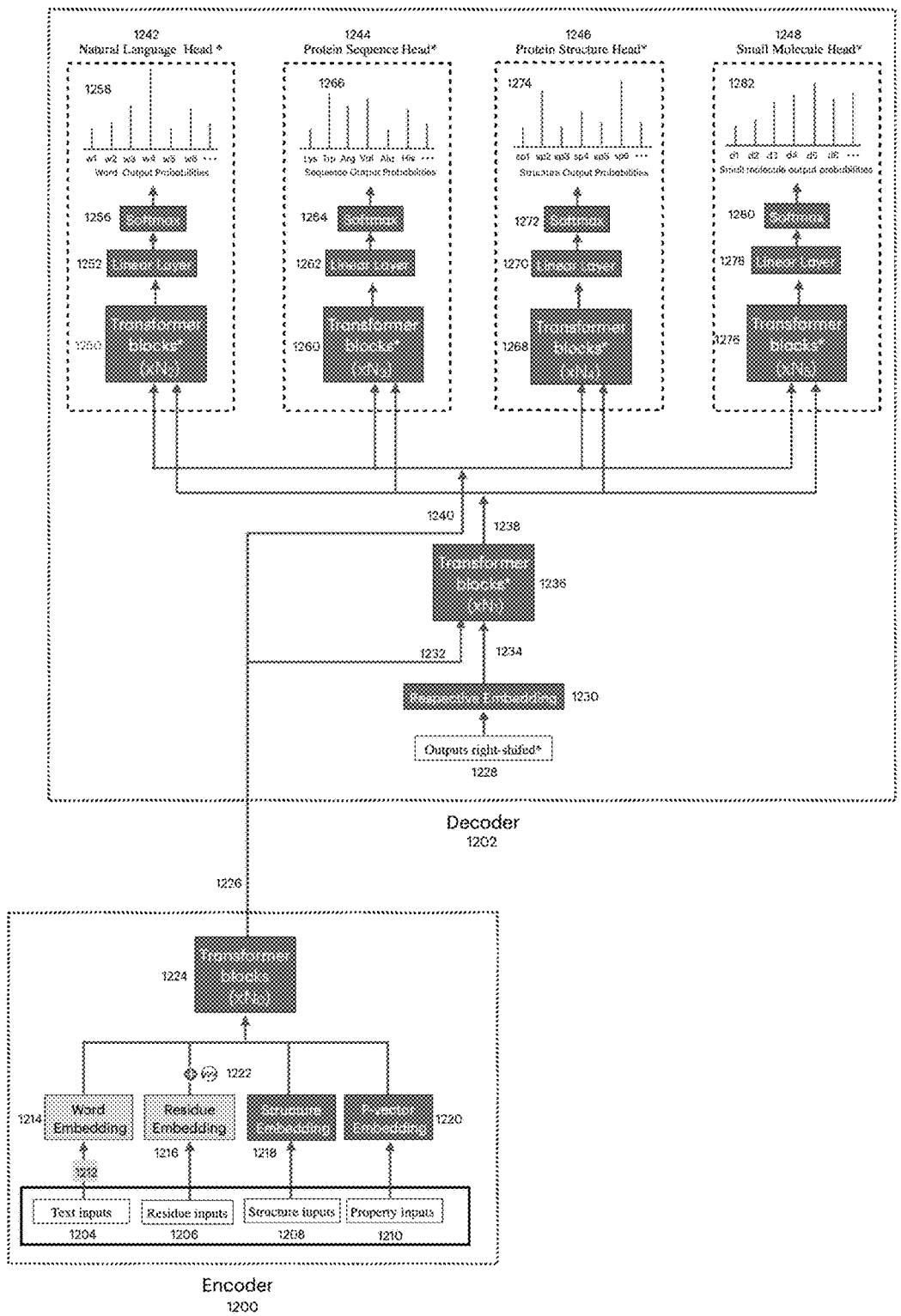
FIG. 12 A Multicapitate Encoder-Decoder Transformer Training Architecture for Mixed Modality Protein and Natural Language Fusion.

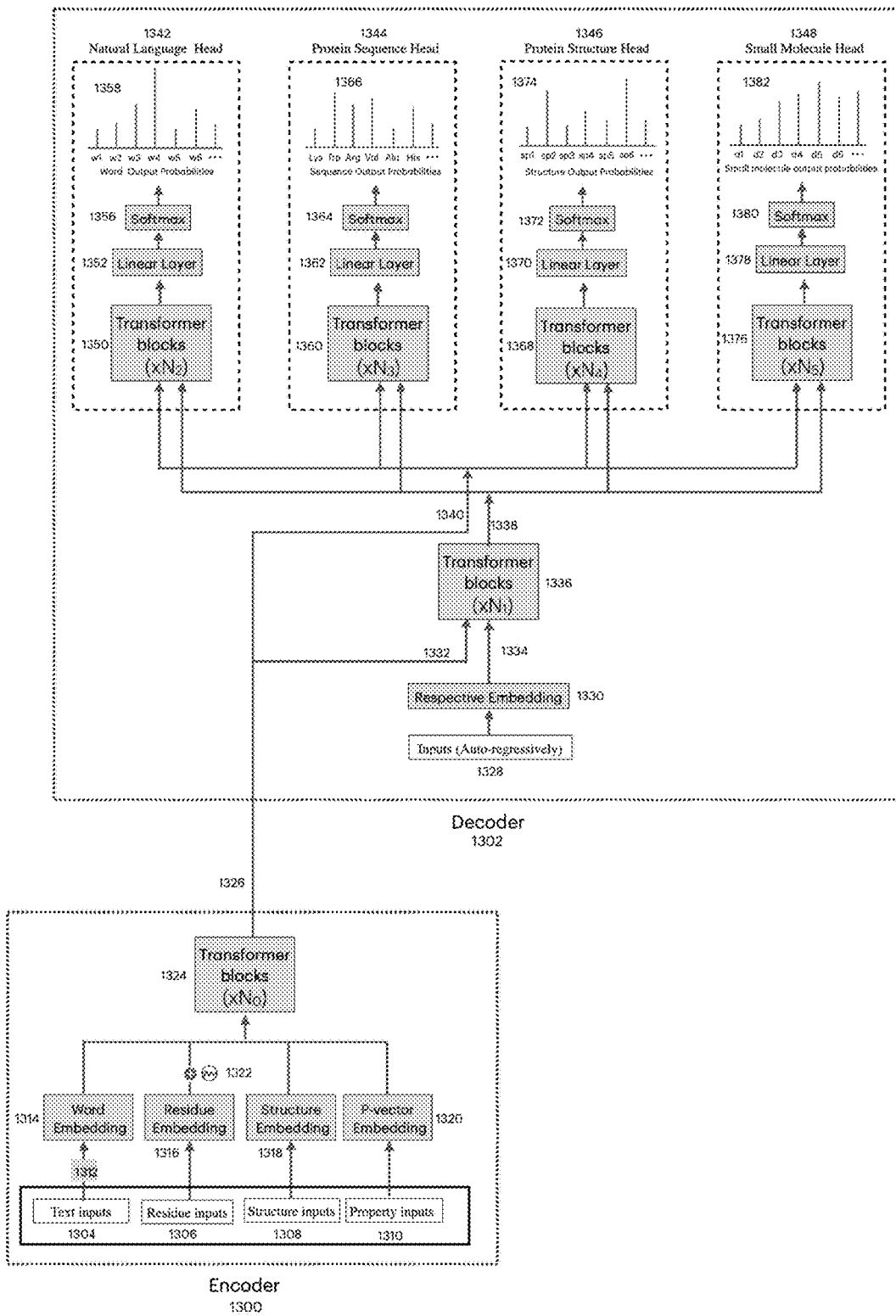
FIG. 13 A Multicapitate Encoder-Decoder Transformer Inference Architecture for Mixed Modality Protein and Natural Language Fusion.

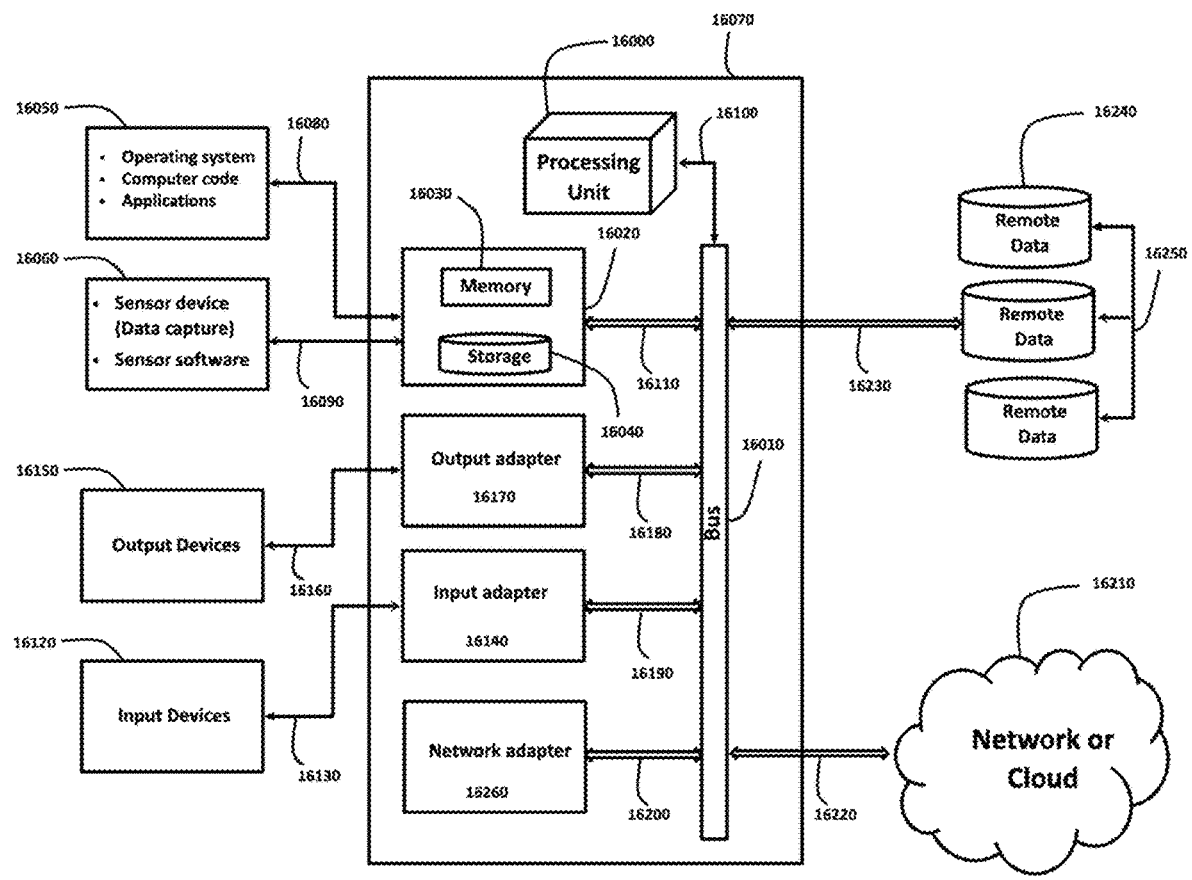
FIG. 14 Computing Environment

REASONING FROM SUPERVISED FINE TUNING OF LANGUAGE FUSION MODELS FOR AI-BASED PROTEIN AND DRUG DESIGN

The present invention relates generally to Artificial Intelligence (AI) and Machine Learning (ML) methods for protein and drug design, and specifically to large language models for protein and drug design.

BACKGROUND OF THE INVENTION

Many diseases remain without effective treatments or without any treatment at all. This problem persists despite decades of research and development efforts, including an estimated $300B annual expenditure on pharmaceutical research globally. In particular, it costs $2.6B and 10-15 years on average to develop a new drug that makes it through development, clinical testing, and onwards to the patients who need them. The high cost and low success rate of drug development is highly problematic, especially in light of how much is now known about cellular mechanisms, combined with the new and powerful methods emerging from the field of deep learning.

Deep learning and its potential to accelerate the drug discovery and development process has generated much interest and excitement. However, this promise has yet to materialize, due largely to a conspicuous lack of deep learning-based tools to effectively reason through the rich and high dimensional feature space of target proteins and their associated cell signaling mechanisms.

Much of what is known about proteins, signaling mechanisms, and ligands is encoded in a plurality of modalities including natural language and protein language modalities. This implies that mixed modality neural networks are essential tools for effective drug discovery and development.

Furthermore, the vast plurality of features required to characterize proteins implies a complex web of dynamic relationships within and across proteins and their features. These relationships are learnable in an end-to-end differentiable manner, and furthermore are a basis for reasoning and logical deduction. Tools with such capability to reason at the receptor and intracellular signaling levels will greatly increase the likelihood of discovering and developing effective new drugs. However, prior to the disclosure of this invention, no such tools were in existence.

Recently, it has become known that supervised fine tuning using chain-of-thought data can confer reasoning capability on large language models. See for example:

[1] Wei, Jason, Xuezhi Wang, Dale Schuurmans, Maarten Bosma, Fei Xia, Ed Chi, Quoc V. Le, and Denny Zhou. "Chain-of-thought prompting elicits reasoning in large language models." *Advances in Neural Information Processing Systems* 35 (2022): 24824-24837,

[2] Kojima, Takeshi, Shixiang Shane Gu, Machel Reid, Yutaka Matsuo, and Yusuke Iwasawa. "Large language models are zero-shot reasoners." *Advances in Neural Information Processing Systems* 35 (2022): 22199-22213, and

[3] Lightman, Hunter, Vineet Kosaraju, Yuri Burda, Harrison Edwards, Bowen Baker, Teddy Lee, Jan Leike, John Schulman, Ilya Sutskever, and Karl Cobbe. "Let's verify step by step." In *The Twelfth International Conference on Learning Representations*. 2023.

However, prior to the disclosure of this invention, there were no mixed modality protein and natural language reasoning models in existence. This gap represented a significant unmet need for methods that can properly represent the rich and diverse feature space of proteins, while also having the capability to reason in an end-to-end manner. The invention disclosed meets this need, and therefore greatly increases the likelihood of discovering and developing novel and effective drugs.

OBJECTS OF THE INVENTION

It is an object of this invention to provide a system, method, and apparatus for obtaining a mixed modality language model with reasoning capability, wherein the model is used to obtain representations of proteins for synthesis.

Another object of this invention is to provide a system, method, and apparatus for obtaining a mixed modality language model with reasoning capability, wherein the model is used to obtain representations of small molecule drugs for manufacture.

Yet other objects, advantages, and applications of the invention will be apparent from the specifications and drawings included herein.

SUMMARY OF THE INVENTION

The invention disclosed herein includes a method comprising performing supervised fine tuning (SFT) on a pre-trained mixed modality protein and natural language model, whereby the SFT data consists of pairs of mixed modality reasoning-oriented input queries and corresponding mixed modality chain-of-thought responses.

A chain-of-thought is a representation of a response to an input query, wherein the response is logically broken down explicitly into step-by-step parts that combine deductively or inductively to yield the final response to the input query.

Specifically, as used here in the Specifications as well as in the Claims, chain-of-thought means any response sequence wherein the sequence is partitioned into sub-sequences such that the final sub-sequence derives logically from the preceding sub-sequences. Without loss of generality, in some embodiments, the respective sub-sequences of the response sequence are termed "thoughts," hence the overall response pattern is termed a "chain-of-thought" pattern.

Here and in the claims, each individual non-final sub-sequence (or thought) in a chain-of-thought need not derive directly from the preceding sub-sequences. However, the final sub-sequence (which without loss of generality in some embodiments can be termed a "summary" or "final answer") needs to derive logically from the preceding sub-sequences.

Here and in the claims, a reasoning-oriented query is an input query whose output response can be represented as a chain-of-thought.

In the invention disclosed herein, chain-of-thought data is used for supervised fine tuning of pre-trained mixed modality protein and natural language models. The supervised fine tuning process consists of using pre-trained mixed modality models to perform inference on mixed modality reasoning-oriented queries. The resulting mixed modality output is then used to compute a loss function value against the chain-of-thought output response data corresponding to that input.

Stochastic gradient descent (or other optimization method) is then used to iteratively update the weights of the pre-trained model till termination criteria are met. The resulting fine tuned model so trained to have reasoning capability, is then used to output representations of proteins or small molecule drugs for manufacture; wherein the output is in response to mixed modality input queries specifying conditions on the output.

In summary, the invention disclosed herein consists of systems, methods, and apparatus to use data consisting of (reasoning-oriented query, chain-of-thought response) pairs for supervised fine tuning of pre-trained mixed modality models. The modalities include but are in no way limited to protein sequence and natural language representation modalities. The resulting fine tuned reasoning model is used to provide representations of proteins for synthesis or small molecule drugs for manufacture; wherein the reasoning-oriented query specifies conditions on the output.

The invention consists of several outlined processes below, and their relation to each other, as well as all modifications which leave the spirit of the invention invariant. The scope of the invention is outlined in the claims section.

BRIEF DESCRIPTION OF THE DRAWINGS

In the following detailed description of the invention, we reference the herein listed drawings and their associated descriptions, in which:

FIG. 1 is a schematic illustration of a chain-of-thought (CoT) example.

FIG. 2 is an illustrative example of a chain-of-thought (CoT) syntax format.

FIG. 3 is a 2D representation of a G-Protein Coupled Receptor (GPCR).

FIG. 4 is an illustrative example of a long chain-of-thought output response to an input query.

FIG. 5 is a schematic overview of supervised fine tuning with chain-of-thought data yielding a reasoning fusion language model.

FIG. 6 is a schematic illustration of a recursive supervised fine tuning schema yielding a reasoning fusion language model.

FIG. 7 is an illustrative overview of inference with a mixed-modal early-fusion language model for protein and drug design.

FIG. 8 is an illustrative overview of a training process for a mixed-modal early-fusion language model for protein and drug design.

FIG. 9 is an illustrative overview of the inference process with a mixed-modal early-fusion language model for small molecule drug design.

FIG. 10 is an illustrative overview of the pre-training process for a mixed-modal early-fusion language model for small molecule drug design.

FIG. 11 is an illustrative overview of inference for an interleaved modality task.

FIG. 12 is a multicapitate encoder-decoder transformer training architecture for mixed modality protein and natural language fusion.

FIG. 13 is a multicapitate encoder-decoder transformer inference architecture for mixed modality protein and natural language fusion.

FIG. 14 is an example of a computing environment.

DETAILED DESCRIPTION OF THE PREFERRED EMBODIMENTS

The illustration in FIG. 1 is a schematic illustration of a Chain-of-Thought (CoT) representation. In response to an input query 100, a chain of thought is a step-by-step representation of the response in such a way that the logical sequence leading to the answer is made explicit. Here, Thought One 110 leads to Thought Two 120 and so on till the Final Answer 130 is deduced.

The approach is to cast the training data for supervised fine tuning into a form that essentially unfolds the deductive (or inductive) reasoning process. This serves to teach the pre-trained model how to reason in the sense of proceeding logically in sequence from one thought to the next, till an accurate response to the input query is obtained.

Here and in the Claims, chain-of-thought means any response sequence wherein the sequence is partitioned into sub-sequences such that the final sub-sequence derives logically from the preceding sub-sequences. Without loss of generality, in some embodiments such as that illustrated in FIG. 1, the respective sub-sequences of the response sequence are termed "thoughts," hence the overall response pattern is termed a "chain-of-thought" representation.

Here and in the claims, each individual non-final sub-sequence in a chain-of-thought need not derive directly from the preceding sub-sequences. However, the final sub-sequence (which without loss of generality in some embodiments can be termed a "summary" or "final answer") does need to derive logically from the preceding sub-sequences.

FIG. 2 is a non-limiting illustrative example of a chain-of-thought syntax format. By way of example not limitation, in response to an input query 200, a chain-of-thought 210 can be syntactically represented as a sequence of thoughts wherein each thought is delineated by "think" tags, <Think> . . . <\Think>, as shown in FIG. 2; and as was done in Guo, Daya, et al. "DeepSeek-R1: Incentivizing Reasoning Capability in LLMS via Reinforcement Learning." *arXiv preprint arXiv:*2501.12948 (2025).

Of note, "think" tags as used in this embodiment are human readable and intuitive. However, since this is supervised learning, any one of an arbitrarily vast plurality of textual markup code syntax can be devised to encode and delineate each thought in the CoT. The neural network 205 will learn the thought delineation syntax during training.

The illustration in FIG. 3 is a two dimensional representation of a G-Protein Coupled Receptor (GPCR). The figure exemplifies the diversity of features that can characterize any given protein, such that a mixture of modalities, including natural language, is required to adequately represent the protein and its associated features; wherein the features include sequence, structure, function, binding partners, interactions, interactors, and properties.

The rich feature space exemplified here by GCPRs is typical of proteins in general. Therefore, methods to make logical deductions across protein features and their interrelationships are a vital unmet need in the quest for effective and efficient novel drug discovery and development.

In the case of GPCRs as exemplified by FIG. 3, the protein consists of a number of domains, each with its own characteristic features. For instance, there is an N-terminus 300, an N-terminal tail 375, a C-terminus 305, and a C-terminus tail 380. Furthermore, there are three extracellular loops, i.e. the first extracellular loop (ECL1) 310, the second extracellular loop (ECL2) 315, and the third extracellular loop (ECL3) 320. Similarly, there are three intracellular loops, i.e. the first intracellular loop (ICL1) 360, the second intracellular loop (ICL2) 365, and the third intracellular loop (ICL3) 370.

There are seven transmembrane alpha-helices, hence the name seven transmembrane receptors or 7TMRs, which is an alternate name for the GPCRs. Shown in FIG. 3 are the first transmembrane domain (TM1) 325, the second transmembrane domain (TM2) 330, the third (TM3) 335, fourth (TM4) 340, fifth (TM5) 345, sixth (TM6) 350, and seventh (TM7) 355. The cell membrane 385 is also shown. The transmembrane alpha helices have a tertiary barrel-like arrangement and typically serve—via their extracellular facing side—as the ligand binding site for small molecule drugs, while larger ligands such as peptide ligands typically bind to the extracellular loops. In the inactive state, the GPCR is bound to a heterotrimeric G-protein. Upon agonist binding, a structural change in the receptor causes a GDP for GTP exchange on the G-protein alpha subunit ($G_\alpha$). This in turn induces dissociation of $G_\alpha$ from the beta-gamma subunit ($G_{\beta\gamma}$); and downstream signaling proceeds.

Such a highly specific orchestrated ensemble of events is typical of cellular processes and cannot be adequately represented computationally without employing a mixture of representation modalities including natural language, protein sequence, protein structure, and small molecule ligand representations. Furthermore, this highly rich and temporally dynamic feature space implies that deductive reasoning across the features and their interrelationships is necessary for effective drug discovery and development.

Figure 4:
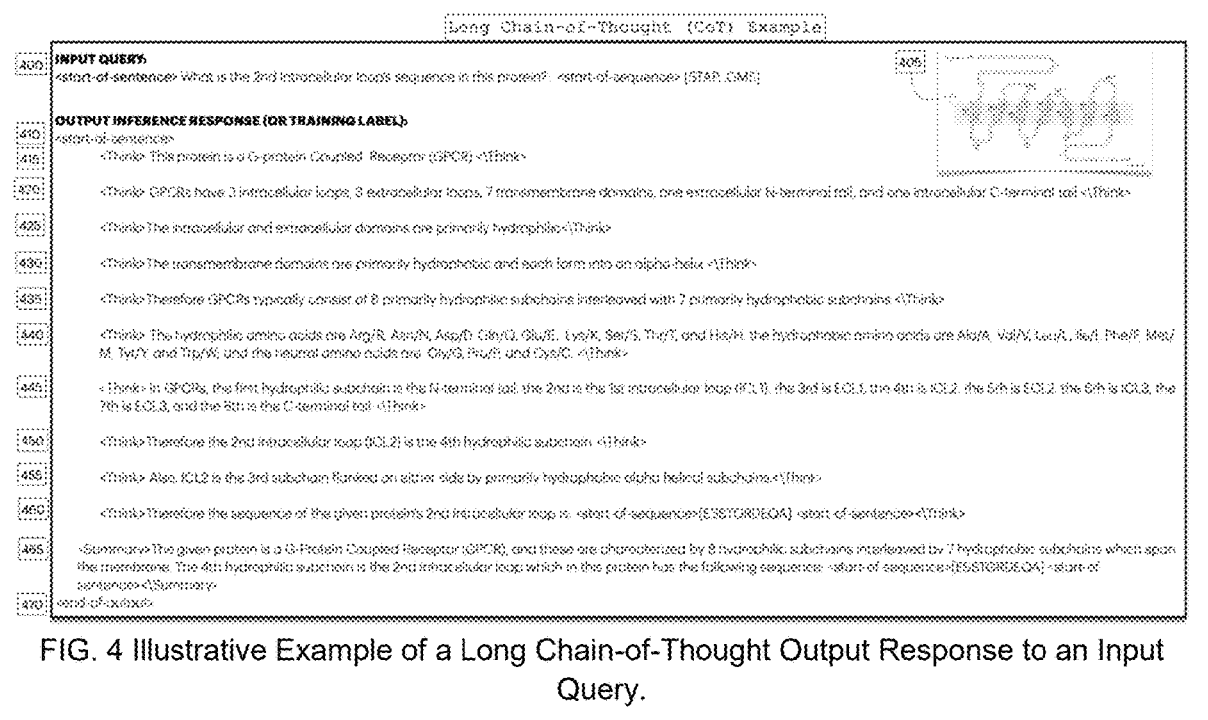

FIG. 4 is an illustrative example of a mixed modality long chain-of-thought response 410-470 to a GPCR-related mixed modality reasoning-oriented input query 400. The subject GPCR is the one exemplified in FIG. 3 and is shown here in inset 405. In this example, the input query is:

<start-of-sentence> What is the 2nd intracellular loop's sequence in this protein?: <start-of-sequence>[STAPL-STVCAG . . . ].

The modality of the above input query is mixed as it includes a natural language modality as well as a protein sequence modality. In this embodiment of the invention, natural language modality streams begin with a <start-of-sentence> token, while protein sequence streams begin with a <start-of-sequence> token, each as shown in 400.

The corresponding output response 410-470 is of a particular markup syntax as shown, wherein each thought in the chain-of-thought is contained within <Think> . . . <\Think>tags. Furthermore, delineation of modalities within a given sequence is implemented via auxiliary tokens which respectively mark the start of their corresponding modality streams. In this embodiment, the chain-of-thought concludes with a summary 465 within <Summary> . . . <\Summary>tags, wherein the auxiliary tokens function as previously noted to indicate the start of each modality within the summary. In this embodiment, the overall output end is indicated with an <end-of-output> token 470.

FIG. 5 is a schematic overview of supervised fine tuning with chain-of-thought data yielding a reasoning fusion language model. In this embodiment of the invention, a pre-trained mixed modality protein and natural language fusion model 500 is supervised fine tuned using chain-of-thought data 510. The chain-of-thought data consists of mixed modality query response pairs, wherein the responses are formatted chains-of-thought such as exemplified in FIG. 4. The supervised fine tuning process 515 entails using the pre-trained model 500 to perform inference on reasoning-oriented input queries in the training data, and then computing the loss function value using the corresponding chain-of-thought responses. The SFT training process consists of using stochastic gradient descent or other optimization method to iteratively update the model weights. At convergence, the process yields a reasoning mixed modality language model 520.

The embodiment of the invention illustrated in FIG. 6 consists of recursively performing supervised fine tuning to yield a reasoning fusion language model. Using chain-of-thought (CoT) data 610, an initial supervised fine tuning procedure 615 is performed on a pre-trained mixed modality language model 600. This initial SFT run 615 jump starts the pre-trained model towards reasoning objectives from both an output format (i.e. CoT) and an accuracy perspective.

The resulting fine-tuned model 620 is then further improved recursively by using it for inference 625 on a plurality of reasoning-oriented input queries, thereby yielding a reasoning-prompted chain-of-thought dataset 630. This dataset can then be filtered 635 according to one or more of a plurality of user-specified criteria including but in no way limited to format, length, and accuracy. This filtering process then yields a filtered reasoning prompted chain-of-thought (CoT) dataset 640 which is then used in turn for supervised fine tuning 645 of the model. This recursive process is repeated N times 650, where N is a design hyperparameter. Upon termination criteria being met, the recursively supervised fine tuned final reasoning model 655 is returned as output.

In the above described embodiments of the invention, the starting point of the supervised fine tuning process is a pre-trained mixed modality protein and natural language model. The pre-training processes for some embodiments of the invention are described in the following aspects of these specifications. However, these pre-training embodiments are non-limiting examples which in no way impose restrictions on the invention disclosed herein.

FIG. 7 is an illustrative overview of inference with a pre-trained mixed modality protein and natural language model. An input query consisting of a stream of mixed modality representations of data—including a natural language representation 700, a protein sequence representation 710, and a protein structure representation 715—is transformed into a mixed modality stream of output data consisting of natural language 765, protein sequence 780, and protein structure 792 modalities. In particular, the input query requests a peptide agonist for a specified receptor 705, and the output stream provides a representation of a peptide agonist 796 of that receptor.

In the embodiment exemplified in FIG. 7, the natural language prompt 700 is preprocessed 720 by tokenization and embedding. This results in a set of input tokens. A <start-of-sentence> token 725 indicates that the incoming stream of embedding vectors are of a natural language representation modality.

Similarly, the protein sequence input data 710 is preprocessed 730 by embedding, yielding a set of embedding vectors. A <start-of-sequence> token 735 indicates that the incoming stream is of a protein sequence representation modality.

Similarly, the protein structure input data 715 is preprocessed 740 by embedding, yielding a set of embedding vectors. A <start-of-structure> token 745 indicates that the incoming stream is of a protein structure representation modality.

The set of input vector embeddings are served as input into a mixed modality autoregressive language model 750. A <start-of-sentence> token 755 is used to mark the start of the output stream. The output stream's tokens arise one token per iteration, after which the output is joined with the input context array in standard autoregressive language model fashion. The returned output from one iteration is then available for self attention on the next iteration. In this embodiment, the immediate natural language output of the autoregressive language model is detokenized 760 to yield the natural language.

A <start-of-[MODALITY]> token indicates that the incoming stream will be of the specified modality, as such it serves the dual purpose of indicating that the prior modality will pause (or halt). In this example, the <start-of-sequence> token 770 in the output stream indicates that the natural language modality is paused and the protein sequence modality begins. The output of the protein sequence channel can directly be a protein sequence, and therefore in such embodiments, no post processing 775 involving detokenization and unembedding would be needed. Alternatively, other embodiments can involve a detokenization and unembedding post-processing step 775.

In this embodiment (FIG. 7), the <start-of-structure> token 785 indicates a pause in the protein sequence stream and a start of the protein structure stream. The output stream ends altogether upon encountering an <end-of-output> token 794. Together, the output protein sequence representation 780 and structure representation 792 specify a representation of a peptide agonist 796 of the target receptor 705.

FIG. 8 is an illustrative overview of a training process for a mixed-modal early-fusion language model for protein and drug design. This particular example illustrates a mixed modality input query consisting of natural language 810, protein sequence 825, and protein structure 830 modalities; wherein the associated output stream's training labels 892 are also of mixed modality.

A natural language database 800 including natural language representations of a plurality of features of a plurality of proteins, can be crossed in a number of ways with a protein sequence and structure database 820. For instance, in one embodiment, references to proteins in the natural language database are replaced with the sequence and/or sequence and structure of the respective proteins. This yields a mixed modality database. In addition, relationships between proteins in a protein database are expressed in natural language also yielding a mixed modality database of protein language and natural language.

The resulting mixed modality database obtained by a crossing of a natural language database 800 and a protein database 820 can then be used for pre-training of the mixed modality autoregressive language model 865. In one embodiment, the autoregressive task is next-token prediction. The mixed modality (crossed) database can be partitioned into training and test sets, and training labels 892 used to compute a loss function value. An optimization such as gradient descent can then be applied end-to-end. In some embodiments of the invention, auxiliary tokens such as <start-of-[MODALITY]> tokens are used to indicate the pausing of one modality stream and the start of another. For instance, during a natural language output stream, the emergence of a <start-of-sequence> token 876 signals a pause of the natural language stream and a commencement (or resumption) of the protein sequence stream. An <end-of-output> token 888 indicates the end of the output stream.

In some embodiments, a general natural language database is first topically filtered 805 for relevance before or after modality-crossing of the databases. Next, the respective embeddings are performed for the modalities: here, natural language embedding 835, protein sequence embedding 850, and protein structure embedding 860. The resulting context array of embeddings delineated with <start-of-[MODALITY]> between modal streams, is passed as input into the mixed modality autoregressive language model 865.

In this supervised learning framework, for any given token, all the conditioning as well as the next token to be predicated are known. Hence, the training procedure can be conducted in parallel wherein each token is associated with a distinct thread, and the model weights are shared.

FIG. 9 is an illustrative example overviewing the inference process with a mixed modality early fusion language model for small molecule drug design. The inference procedure of FIG. 9 is materially identical to that described in FIG. 7, and the respective architectures are similar. One difference in these two examples is the input query with which inference is illustrated. In FIG. 9, the input query requests a small molecule drug ligand of the specified target receptor 905, while in FIG. 7, the input query requests a peptide ligand. Consequently, the output here in FIG. 9 is a mixture of natural language modality and a small molecule drug modality, as reflected in the output which is a concatenation of a natural language stream 965 and a small molecule drug 980. In each scenario illustrated in FIG. 7 and FIG. 9 respectively, the architecture of the neural network must be appropriately designed to handle the input and output modalities in the mixture.

FIG. 10 is an illustrative overview exemplifying a pre-training procedure of a mixed modality fusion language model for small molecule drug design. The pre-training procedure of FIG. 10 is materially identical to that described above for FIG. 8. The respective architectures are similar. As in the prior comparison, one difference in these two examples is the input query with which the forward pass is illustrated. In FIG. 10, the input query requests a small molecule drug ligand of a specified target receptor sourced from the receptor database 1020, while in FIG. 8, the input query requests a peptide ligand. Consequently, the output here (FIG. 10) is a mixture of natural language modality and a small molecule drug modality, as reflected in the output which is a concatenation of a natural language stream 1080 and a small molecule drug 1088.

FIG. 11 is an illustrative example overviewing inference for an interleaved modality task. The input query consists of three modalities: natural language, protein sequence, and protein structure. The natural language input stream 1100, queries for two small molecule drugs and one peptide agonist. The query subject, a target receptor 1102, is bimodally specified via a protein sequence stream 1104 and a protein structure stream 1106. The natural language part 1100 of the input array says "Generate two small molecule ligand drugs and one peptide agonist for this receptor:" The mixed modality autoregressive language model 1120 must have been trained adequately enough to output the illustrative stream which semantically satisfies the input query's request. In particular, the autoregressively generated output stream begins with a <start-of-sentence> 1122, followed by natural language output stream 1126. Next a <start SMD> token 1128 signals a pause in the natural language stream and the start of the SMD stream. Next an SMD 1132 is output followed by another <start SMD> token 1134 closing the prior SMD stream and commencing the next one in accordance with the input query request. The next SMD 1138 is output followed by another <start-of-sentence> token 1140 indicating the start of a natural language stream 1144. This is followed by a <start-of-sequence> token 1146 indicating the start of the sequence stream 1150 of the peptide agonist. This is followed by a <start-of-structure> token 1152 signaling for the end of the output sequence stream and the start of the protein structure stream 1156. Together, the output protein sequence stream and its associated protein structure stream constitute an output representation of the peptide agonist 1158. Finally, an <end-of-output> token 1160 signals for a halt of the output stream.

FIG. 12 is an illustrative example of a multicapitate encoder-decoder transformer training architecture for mixed modality protein and natural language fusion. In this embodiment, the encoder 1200 can accept a concatenated array of input data of a mix of modalities. In this particular example, the input modalities include natural language (or "text") 1204, protein sequence (or "residues") 1206, structure inputs 1208, and property inputs 1210, which are a prespecified data structure (a p-vector) encoding a pre-specified set of properties.

The input data for natural language 1204, sequence 1206, structure 1208, and property 1210, are each passed through their respective embeddings, i.e. word embedding 1214, residue embedding 1216, structure embedding 1218, and p-vector embedding 1220. The concatenated array of output embedding vectors encodes an input query whose response is a mixed modality output stream at the terminus of the decoder 1202. The mixed modality output stream is measured against the corresponding training label for the input context array. In this particular embodiment, the multicapitate ("multiple headed") architecture consists of one head per output modality: a natural language head 1242, a protein sequence head 1244, a protein structure head 1246, and a small molecule head 1248. Since this is a training architecture, each of the respective output heads are associated with a loss function computation, indicated in the figure by an asterisk.

Back to describing the encoder 1200: Each modality of the input data array has a respective embedding. The natural language inputs are first tokenized 1212 prior to being passed into its embedding, the word embedding 1214. The amino acid sequences are acted on by the respective embedding, the residue embedding 1216; the structure inputs are acted on by a structure embedding, and the pre-specified property inputs are acted on by the p-vector embedding. The residue embedding vector is imprinted with a positional encoding 1222.

The embedding vector array is then passed into a set of repeating transformer blocks 1224. The number of repeats No is a design hyperparameter of the architecture. Within each transformer block is a self-attention mechanism. The transformed output array from the encoder is then passed 1226 into the decoder for cross-attention.

The encoder 1200 can accept a structure input vector 1208 into the structure embedding 1218. The structure input vector is a vector of structure parameters. In one embodiment, it is of fixed length, L, and zero padding is used for target proteins whose structure parameters are represented by a vector of smaller length than the fixed length, L. The fixed length, L, is a hyperparameter.

The structure embedding 1218 is a weight matrix, $W_s$, which the structure input vector, x, 1208 multiplies to yield the structure embedding vector, s, as follows:

$$W_s x = s$$

where $W_s$ is an m×L matrix, L is the fixed length of the structure input vector, and m is the length of the amino acid residue embedding vectors, the length of the property (p-vector) embedding vectors, and the length of the word embedding vectors. They all have the same length m. Both m and L are hyperparameters of the model.

The encoder 1200 can also accept a protein's amino acid residue inputs 1206, which can be in the form of one-hot-encoder vectors which are passed into the residue embedding 1216, wherein the residue embedding is itself a trained neural network. A position encoding 1222 can be added to the output residue embedding vectors to imprint a signal of sequence position on the respective residue embeddings.

A variable length array of vectors consisting of embedding vector(s)—wherein each vector is from one of the represented modalities—is passed as input into the transformer block 1224. The first layer of the transformer block is an attention layer.

Here and in the claims, transformer means a neural network with an attention mechanism. There are a plurality of ways to implement attention mechanisms. In one embodiment, attention layers consist of three types of weight matrices: a query weight matrix, $W_q$, a key weight matrix, $W_k$, and a value weight matrix, $W_v$. Each of the embedding vectors in the array are then multiplied by each of the three matrices to obtain respective queries, keys, and values, as follows:

$$W_q u = q$$

$$W_k u = k$$

$$W_v u = v$$

where u is an embedding vector (i.e. in this embodiment u is a word embedding vector, residue embedding vector, structure embedding vector, or p-vector embedding vector).

For each embedding vector in the array, the dot product of its respective query vector is taken with the key vectors of all token representations in the context array. Next, a softmax operation is done on the resulting array to yield a probability distribution for each token. Next, for each token, a linear combination of values v is taken wherein the coefficient of each value is the respective probability (i.e. attention weight). The output of this linear combination is then taken as the token's respective output into the next layer of the transformer. This is done for each token in the encoder, therefore the length of the input array and the length of the output array from this attention layer are the same. Given the ith token, its corresponding coefficient associated with the jth token can be denoted $c_{ij}$ and is given by, $$c_{ij} = \frac{e^{<qi,kj>}}{\sum_p e^{<qi,kp>}}$$

The attention layer output of the ith token can be denoted $o_i$ and is then given by, $$o_i = \Sigma_j c_{ij} v_j$$

In some embodiments, the dot product $<q_i, k_j>$ can be scaled by a variance factor.

The array of outputs $o_i$ are then passed into a normalization layer. Furthermore, a copy of the input array which was passed into the attention layer is passed into and added to a normalization layer, skipping the attention layer. This skip connection serves to preserve the pre-attention layer character signal thereby enhancing available signals for learning.

The output from the Add skip & Norm layer is passed into a feed forward neural network layer and from there into another Add skip & Norm layer. The encoder transformer block 1224 of "attention→add skip & norm→feed forward→Add skip & norm" is repeated $N_0$ number of times where $N_0$ is a hyperparameter of the model architecture.

Per autoregression, the inputs 1228 into the decoder are the right-shifted outputs of the decoder. Here, the asterisk indicates that this can be run in parallel, one thread per token, since all conditioning tokens and the next-token (i.e. the label) are all known. At each iteration of the autoregression, the input is acted on by the respective embedding 1230 to yield an embedding vector which is passed into the set of repeating transformer blocks 1236. The transformer blocks of the decoder are as described earlier for the encoder, with the exception of 'masked attention.' Unlike the encoder, here in the decoder, in this embodiment, each transformer block consists of a 'masked attention' layer simply implementing the right-shifting in that the next token to be predicted as well as all future tokens are kept masked from the prediction algorithm under training. The current input token and all preceding tokens, however, are visible to the prediction algorithm under training, and furthermore are used as the context array elements for self-attention. The output of the self-attention layer passes into an add-skip-norm layer and onwards into a cross-attention layer. This input is the subject token of the cross-attention layer, while the encoder's final layer output is the remainder of the context array for cross-attention.

The number of repeats $N_1$ of the decoder body transformer block 1236 is a design hyperparameter of the model. The resulting final output of the repeating sequence of decoder body transformer blocks is passed 1238 into each head of the decoder as shown. In addition, the encoder's final layer output is also passed 1240 into each of the decoder's heads for cross-attention.

The respective number of repeats—$N_2$, $N_3$, $N_4$, $N_5$—of the decoder head transformer blocks are also design hyperparameters of the model. Furthermore, they can be zero, in that some heads may have no transformer blocks.

The final output layer of the decoder head transformer blocks is passed into a linear layer which spans the possible values of each respective head. E.g. in the case of the natural language head it spans the language's vocabulary; in the case of the sequence head, it spans the set of amino acids; in the case of small molecule drug (SMD) head, it spans a library of SMDs. In each case the domain also includes auxiliary tokens such as <start-of-[MODALITY]> tokens or <end-of output> tokens.

The linear layer output in turn passes into a softmax layer, yielding a probability distribution over the possible values of the respective heads including auxiliary tokens such as <start-of-[MODALITY]> tokens or <end-of output> tokens.

In the training architecture, optimization is performed to update the weights using optimization methods such as gradient descent for example. Other optimization methods can be used, such as genetic algorithm, particle swarm, simulated annealing, amongst others.

FIG. 13 is a multicapitate encoder-decoder transformer inference architecture for mixed modality protein and natural language fusion. In this case, the neural network has already been trained, and is being used for inference.

One set of differences between the training (FIG. 12) and the inference (FIG. 13) architectures stems from parallelizeability, in that the training architecture is parallelizeable while the inference architecture is not parallelizeable in the same way. In particular, in the training architecture, since the labels and inputs are all known during training, there is a need for masking in the decoder's attention layer. However, in the inference architecture, the output token generation must be done sequentially, hence no masking is needed.

The other set of differences between the training (FIG. 12) and the inference (FIG. 13) architectures, stems from the basic purpose of training vs inference. In particular, since the inference architecture does not involve training, the sequence and structure heads are not associated with a loss function. Instead, they simply terminate with their respective output probabilities 1358, 1366, 1374, and 1382. The weights are learnable only during training (FIG. 12) but are frozen during inference (FIG. 13).

The embodiments of the invention exemplified in FIG. 12 and FIG. 13 are multicapitate in that the decoder has multiple heads, each with its own loss function. In other embodiments of the invention, however, the decoder has only a single head. In such embodiments, the linear layer spans the set of possible values of each of the represented modalities. For instance, the set would contain all the words in the natural language vocabulary as well as all the amino acids (e.g. 20 amino acids in humans), as well as all the small molecule drugs in a selected library, as well as all the allowed protein structure representation values, as well as all the auxiliary tokens such as <start-of-sentence>, <start-of-structure>, <start-of-SMD>, <end-of-output>, etc. The single unified probability distribution would be sampled at each iteration of the autoregression, and the most probable token would be selected. In the unicapitate embodiments, the auxiliary tokens serve the same function as in the multicapitate embodiments. The neural network supervised learning training process teaches the neural network to perform as instructed by the output stream data labels.

Ones with ordinary skill in the art will recognize that the invention disclosed herein can be implemented over an arbitrary range of computing configurations. We will refer to any instantiation of these computing configurations as the computing environment. An illustrative example of a computing environment is depicted in The Computing Environment FIG. Examples of computing environments include but are not limited to desktop computers, laptop computers, tablet personal computers, mainframes, mobile smart phones, smart television, programmable hand-held devices and consumer products, distributed computing infrastructures over a network, cloud computing environments, or any assembly of computing components such as memory and processing—for example.

As illustrated in The Computing Environment FIG., the invention disclosed herein can be implemented over a system that contains a device or unit for processing the instructions of the invention. This processing unit 16000 can be a single core central processing unit (CPU), multiple core CPU, graphics processing unit (GPU), multiplexed or multiply-connected GPU system, or any other homogeneous or heterogeneous distributed network of processors.

In some embodiment of the invention disclosed herein, the computing environment can contain a memory mechanism to store computer-readable media. By way of example and not limitation, this can Include removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer.

As depicted in The Computing Environment FIG., the computing environment can include a system memory 16030 which can be volatile memory such as random access memory (RAM) and may also include non-volatile memory such as read-only memory (ROM). Additionally, there typically is some mass storage device 16040 associated with the computing environment, which can take the form of hard disc drive (HDD), solid state drive, or CD, CD-ROM, blu-ray disc or other optical media storage device. In some other embodiments of the invention the system can be connected to remote data 16240.

The computer readable content stored on the various memory devices can include an operating system, computer codes, and other applications 16050. By way of example not limitation, the operating system can be any number of proprietary software such as Microsoft windows, Android, Macintosh operating system, iphone operating system (iOS), or Linux commercial distributions. It can also be open source software such as Linux versions e.g. Ubuntu. In other embodiments of the invention, data processing software and connection instructions to a sensor device 16060 can also be stored on the memory mechanism. The procedural algorithm set forth in the disclosure herein can be stored on—but not limited to—any of the aforementioned memory mechanisms. In particular, computer readable instructions for training and subsequent image classification tasks can be stored on the memory mechanism.

The computing environment typically includes a system bus 16010 through which the various computing components are connected and communicate with each other. The system bus 16010 can consist of a memory bus, an address bus, and a control bus. Furthermore, it can be implemented via a number of architectures including but not limited to Industry Standard Architecture (ISA) bus, Extended ISA (EISA) bus, Universal Serial Bus (USB), microchannel bus, peripheral component interconnect (PCI) bus, PCI-Express bus, Video Electronics Standard Association (VESA) local bus, Small Computer System Interface (SCSI) bus, and Accelerated Graphics Port (AGP) bus. The bus system can take the form of wired or wireless channels, and all components of the computer can be located remote from each other and connected via the bus system. By way of example and not of limitation, the processing unit 16000, memory 16020, input devices 16120, output devices 16150 can all be connected via the bus system. In the representation depicted in The Computing Environment FIG., by way of example not limitation, the processing unit 16000 can be connected to the main system bus 16010 via a bus route connection 16100; the memory 16020 can be connected via a bus route 16110; the output adapter 16170 can be connected via a bus route 16180; the input adapter 16140 can be connected via a bus route 16190; the network adapter 16260 can be connected via a bus route 16200; the remote data store 16240 can be connected via a bus route 16230; and the cloud infrastructure can be connected to the main system bus vis a bus route 16220.

In some embodiment of the invention disclosed herein, The Computing Environment FIG. illustrates that instructions and commands can be input by the user using any number of input devices 16120. The input device 16120 can be connected to an input adapter 16140 via an interface 16130 and/or via coupling to a tributary of the bus system 16010. Examples of input devices 16120 include but are by no means limited to keyboards, mouse devices, stylus pens, touchscreen mechanisms and other tactile systems, microphones, joysticks, infrared (IR) remote control systems, optical perception systems, body suits and other motion detectors. In addition to the bus system 16010, examples of interfaces through which the input device 16120 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein, The Computing Environment FIG illustrates that output data, instructions, and other media can be output via any number of output devices 16150. The output device 16150 can be connected to an output adapter 16170 via an interface 16160 and/or via coupling to a tributary of the bus system 16010. Examples of output devices 16150 include but are by no means limited to computer monitors, printers, speakers, vibration systems, and direct write of computer-readable instructions to memory devices and mechanisms. Such memory devices and mechanisms can include by way of example and not limitation, removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer. In addition to the bus system 16010, examples of interfaces through which the output device 16150 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein some of the computing components can be located remotely and connected to via a wired or wireless network. By way of example and not limitation, The Computing Environment FIG shows a cloud 16210 and a remote data source 16240 connected to the main system bus 16010 via bus routes 16220 and 16230 respectively. The cloud computing infrastructure 16210 can itself contain any number of computing components or a complete computing environment in the form of a virtual machine (VM). The remote data source 16240 can be connected via a network to any number of external sources such as NMR spectrometry devices, X-ray diffraction devices, electron microscopes, imaging devices, imaging systems, or imaging software.

In some embodiment of the invention disclosed herein, a sensor system 16060 which captures and pre-processes data is attached directly to the system. For example, this may be an electron microscope (and associated image processing software); it may be a camera in the case of an imaging system, say for processing distance map photographs; or it may be an X-ray crystallography machine or an NMR spectrometer (and associated software), excetera. Stored in the memory mechanism—16020, 16240, or 16210—are machine learning models, algorithms, and data products developed according to the procedures set-forth herein. Computer-readable instructions are also stored in the memory mechanism, so that upon command, protein structure representation data, its substrates and associated data can be captured or can be received over a network from a remote or local previously collated database. This transmission of data can be done over a wired or wireless network as previously detailed, as the source and/or recipient of the data output can be at a remote location.

The objects set forth in the preceding are presented in an illustrative manner for reason of efficiency. It is hereby noted that the above disclosed methods and systems can be implemented in manners such that modifications are made to the particular illustration presented above, while yet the spirit and scope of the invention is retained. The interpretation of the above disclosure is to contain such modifications, and is not to be limited to the particular illustrative examples and associated drawings set-forth herein.

Furthermore, by intention, the following claims encompass all of the general and specific attributes of the invention described herein; and encompass all possible expressions of the scope of the invention, which can be interpreted—as pertaining to language—as falling between the aforementioned general and specific ends.

What is claimed:

1. A method, comprising:
   a) receiving, at a processor, a pre-trained mixed modality neural network:
      i) wherein the representation modalities are for representations of features of proteins,
      ii) wherein the represented features include one or more of sequence, structure, function, interactions, interactors, binding partners, attributes, and properties,
      iii) wherein the neural network is configured to accept as input data, a query consisting of one or more of the modalities, and to yield as output data, a response to the query, wherein the response also consists of one or more of the modalities,
      iv) wherein the neural network is autoregressive,
      v) wherein the neural network has one or more output heads, each with its own loss function,
      vi) wherein for each respective output head of the neural network, the final output is a probability distribution over a set of possible values at that head;
   b) using a plurality of mixed modality reason-oriented query response pairs to perform supervised fine tuning of the pre-trained neural network:
      i) wherein for each reason-oriented query used, the pre-trained neural network's output is scored against a corresponding chain-of-thought response,
      ii) wherein an optimization process is used to iteratively update the weights of the pre-trained neural network,
      iii) wherein the supervised fine tuning weight updates proceed until termination criteria are met,
      iv) wherein the output is a reasoning-oriented mixed modality neural network;
   c) using the reasoning-oriented mixed modality neural network as an output generator method for obtaining a representation of an output ligand, in response to an input query specifying conditions on the ligand;
   d) using the output generator method to generate an output ligand by randomly sampling the output probability distribution of the neural network's active head at each iteration of the autoregression;
   e) running the random-sampling based generation process a plurality of times with a given input query, wherein each of the plurality of runs uses the same input query, and wherein each of the plurality of runs yields a representation of a candidate ligand;
   f) obtaining the plurality of generated representations of ligands as output.

2. The method of claim 1, wherein the respective modalities of the representations include one or more of: natural language representation modality, protein sequence representation modality, protein structure representation modality, or small molecule drug representation modality.

3. The method of claim 2, wherein the input query into the output generator specifies a target receptor and requests a peptide ligand of the receptor; and wherein the generated output is a representation of a peptide ligand of the specified target receptor.

4. The method of claim 3, wherein for each candidate ligand in the plurality of generated representations of peptide ligands, an assessment is made of its interaction, efficacy, and properties with the target receptor, and the most effective ligand is selected.

5. The method of claim 4, wherein the ligand is synthesized.

6. The method of claim 5, wherein the biological or clinical properties of the ligand are assessed in-vitro or in-vivo.

7. The method of claim 6, wherein for each of the modalities on this list: (a) natural language, (b) protein sequence, and (c) protein structure; the input embedding used for input data of the respective modality is distinct from the input embedding used for input data of any of the other modalities on the list.

8. The method of claim 6, wherein the neural network heads include one head for natural language representation output, a different head for protein sequence representation output, a different head for protein structure representation output, and a different head for small molecule drug representation output.

9. The method of claim 2, wherein the neural network is a transformer.

10. The method of claim 2, wherein the input query into the output generator specifies an antigen and requests an antibody of that antigen; and wherein the generated output is a representation of an antibody of the specified antigen.

11. The method of claim 2, wherein the input query into the output generator specifies a target receptor and requests a small molecule drug ligand of the receptor; and wherein the generated output is a representation of a small molecule drug ligand of the specified target receptor.

12. A method, comprising:
   a) receiving, at a processor, a pre-trained mixed modality neural network:
      i) wherein the representation modalities are for representations of features of proteins,
      ii) wherein the represented features include one or more of sequence, structure, function, interactions, interactors, binding partners, attributes, and properties,
      iii) wherein the respective modalities of the representations include one or more of: natural language representation modality, protein sequence representation modality, protein structure representation modality, or small molecule drug representation modality,
      iv) wherein the neural network is configured to accept as input data, a query consisting of one or more of the modalities, and to yield as output data, a response to the query, wherein the response also consists of one or more of the modalities,
      v) wherein the neural network is autoregressive,
      vi) wherein the neural network has multiple output heads, each with its own loss function,
      vii) wherein for each respective output head of the neural network, the final output is a probability distribution over a set of possible values at that head;
   b) using a plurality of mixed modality reason-oriented query response pairs to perform supervised fine tuning of the pre-trained neural network:
      i) wherein for each reason-oriented query used, the pre-trained neural network's output is scored against a corresponding chain-of-thought response,
      ii) wherein the representation modalities of each query and each response are for representations of features of proteins, iii) wherein the represented features include one or more of sequence, structure, function, interactions, interactors, binding partners, attributes, and properties, iv) wherein the respective modalities of the representations include one or more of: natural language representation modality, protein sequence representation modality, protein structure representation modality, or small molecule drug representation modality, v) wherein an optimization process is used to iteratively update the weights of the pre-trained neural network, vi) wherein the supervised fine tuning weight updates proceed until termination criteria are met, vii) wherein the output is a reasoning-oriented mixed modality neural network;

c) using the reasoning-oriented mixed modality neural network as an output generator method for obtaining a representation of an output protein, in response to an input query specifying conditions on the protein;

d) using the output generator method to generate an output protein by randomly sampling the output probability distribution of the neural network's active head at each iteration of the autoregression;

e) running the random-sampling based generation process a plurality of times with a given input query, wherein each of the plurality of runs uses the same input query, and wherein each of the plurality of runs yields a representation of a candidate protein;

f) obtaining the plurality of generated representations of proteins as output.

13. The method of claim 12, wherein the input query into the output generator specifies a target receptor and requests a peptide ligand of the receptor; and wherein the generated output is a representation of a peptide ligand of the specified target receptor.

14. The method of claim 13, wherein for each candidate ligand in the plurality of generated representations of peptide ligands, an assessment is made of its interaction, efficacy, and properties with the target receptor, and the most effective ligand is selected.

15. The method of claim 14, wherein the ligand is synthesized.

16. An apparatus, comprising: a processor and an associated memory, wherein the memory stores instructions that when executed by the processor, cause the processor to:

a) receive a pre-trained mixed modality neural network:
 i) wherein the representation modalities are for representations of features of proteins,
 ii) wherein the represented features include one or more of sequence, structure, function, interactions, interactors, binding partners, attributes, and properties,
 iii) wherein the neural network is configured to accept as input data, a query consisting of one or more of the modalities, and to yield as output data, a response to the query, wherein the response also consists of one or more of the modalities,
 iv) wherein the neural network is autoregressive,
 v) wherein the neural network has one or more output heads, each with its own loss function,
 vi) wherein for each respective output head of the neural network, the final output is a probability distribution over a set of possible values at that head;

b) use a plurality of mixed modality reason-oriented query response pairs to perform supervised fine tuning of the pre-trained neural network:
 i) wherein for each reason-oriented query used, the pre-trained neural network's output is scored against a corresponding chain-of-thought response,
 ii) wherein an optimization process is used to iteratively update the weights of the pre-trained neural network,
 iii) wherein the supervised fine tuning weight updates proceed until termination criteria are met,
 iv) wherein the output is a reasoning-oriented mixed modality neural network;

c) use the reasoning-oriented mixed modality neural network as an output generator method for obtaining a representation of an output ligand, in response to an input query specifying conditions on the ligand;

d) use the output generator method to generate an output ligand by randomly sampling the output probability distribution of the neural network's active head at each iteration of the autoregression;

e) run the random-sampling based generation process a plurality of times with a given input query, wherein each of the plurality of runs uses the same input query, and wherein each of the plurality of runs yields a representation of a candidate ligand;

f) obtain the plurality of generated representations of ligands as output.

17. The apparatus of claim 16, wherein the input query into the output generator specifies a target receptor and requests a small molecule drug ligand of the receptor; and wherein the generated output is a representation of a small molecule drug ligand of the specified target receptor.

18. The apparatus of claim 17, wherein for each candidate small molecule drug ligand in the plurality of generated representations of small molecule drug ligands, an assessment is made of its interaction, efficacy, and properties with the target receptor, and the most effective ligand is selected.

19. The apparatus of claim 18, wherein the ligand is synthesized.

20. The apparatus of claim 19, wherein the biological or clinical properties of the ligand are assessed in-vitro or in-vivo.

* * * * *